J. L. IRBY.
BRICK YARD PLANTS.
No. 175,709. Patented April 4, 1876.
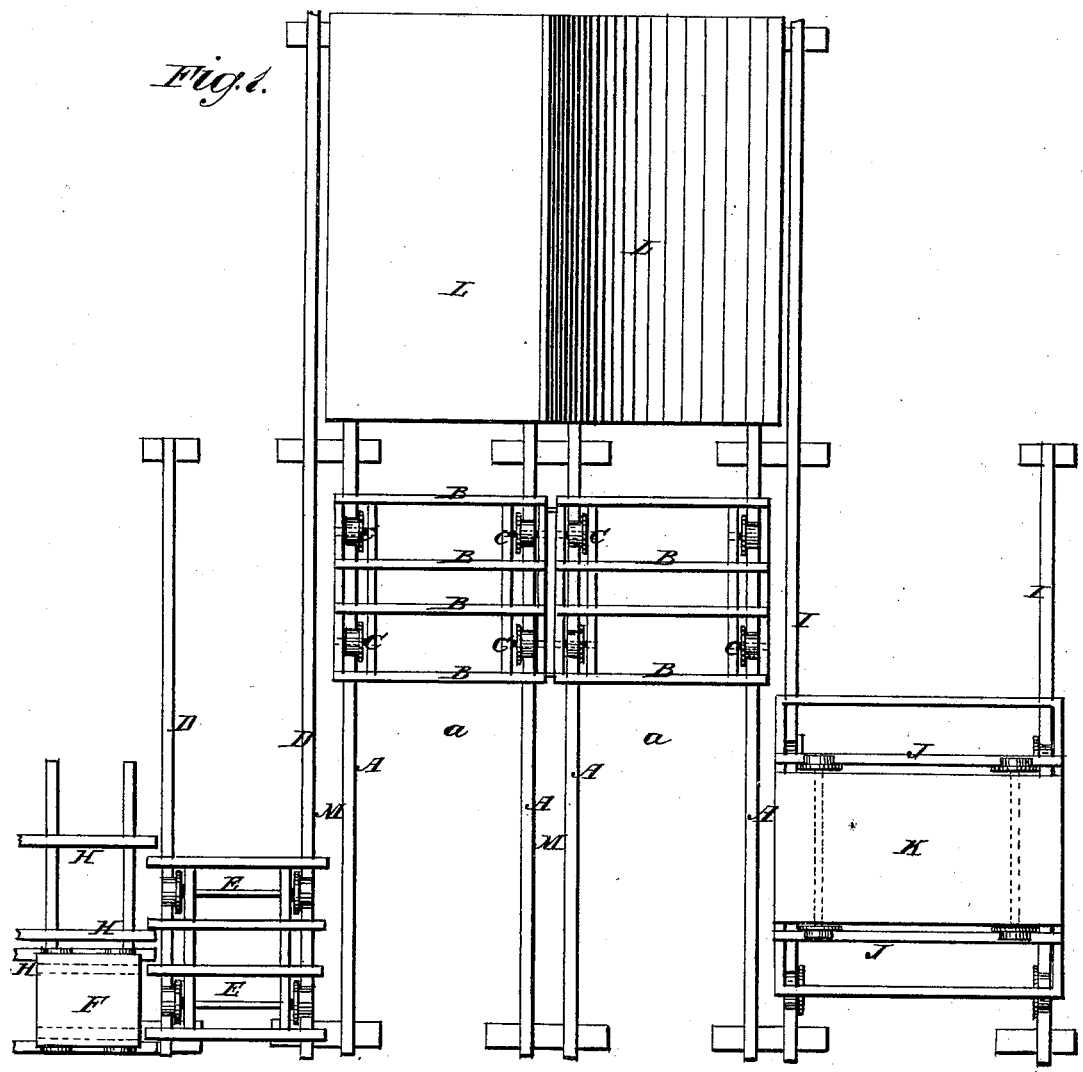

UNITED STATES PATENT OFFICE.

JOSEPH L. IRBY, OF GRENADA, MISSISSIPPI, ASSIGNOR TO HIMSELF AND J. H. CAMPBELL, OF SAME PLACE.

IMPROVEMENT IN BRICK-YARD PLANTS.

Specification forming part of Letters Patent No. 175,709, dated April 4, 1876; application filed February 14, 1876.

*To all whom it may concern:*

Be it known that I, JOSEPH LAFAYETTE IRBY, of Grenada, in the county of Grenada and State of Mississippi, have invented a new and Improved Brick-Yard Plant, of which the following is a specification:

My invention consists of a system of rails and cars for conveying the molded bricks from the mill to the drying-ground, and from the latter to the kiln, more economically than it is done by the common method, and also of a simple contrivance for covering the drying-ground with movable sheds, when necessary, to protect the drying bricks in wet weather.

Figure 1 is a plan view of the apparatus used. Fig. 2 is an end elevation of one of the movable sections of the shed for the drying-ground, and Fig. 3 is a section of some of the trucks used for handling the bricks.

Similar letters of reference indicate corresponding parts.

The drying-yard *a* is laid with tracks A placed side by side, on which are other cross-tracks, B, carried on wheels C, for moving them to any required point along the drying-ground, and on the side of the yard where the mill is located is another track, D, parallel with A, on which are trucks F, onto which the bricks are carried from the mill upon trucks F to be carried along rails D to the transverse rails B, the trucks F being carried on other trucks G, to elevate them to the tracks E, and the trucks G running on rails H from the mill.

On the opposite side of the yard is another track, I, with movable rails J, to receive the bricks from the drying-yard by trucks K, off from rails B, to carry them off to the kiln for burning.

L represents shed-trucks, which are to be placed on rails A, for covering the drying-ground, as at the top of the drawing, for protecting the bricks in wet weather.

From the sheds the water escapes into gutters at M, between the tracks, for carrying it off.

By this system of tracks and trucks the bricks can be handled with less labor than otherwise, and the contrivance is comparatively simple and cheap.

Having thus described my invention, I claim as new and desire to secure by Letters Patent—

1. The improved brick-yard plant, composed of stationary rails A on the drying-ground, movable rails B, stationary rails D, movable rails E, and the trucks F G, and rails H, for conveying the bricks from the mill to the drying-ground, substantially as specified.

2. The stationary rails I, movable rails J, and truck K, combined with stationary rails A, and movable rails B, substantially as specified.

3. The shed-trucks L, and rails A, combined as described.

JOSEPH LAFAYETTE IRBY.

Witnesses:
R. C. PERRY,
I. POITWAIT.